(12) United States Patent
Brannon et al.

(10) Patent No.: US 8,495,027 B2
(45) Date of Patent: *Jul. 23, 2013

(54) PROCESSING ARCHIVE CONTENT BASED ON HIERARCHICAL CLASSIFICATION LEVELS

(75) Inventors: Karen W. Brannon, Palo Alto, CA (US); Wenling Cai, San Jose, CA (US); Sangeeta T. Doraiswamy, San Jose, CA (US); Ryan John Minniear, Folsom, CA (US); David A. Pease, Redwood Estates, CA (US); Mark Andrew Smith, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/534,553

(22) Filed: Jun. 27, 2012

(65) Prior Publication Data

US 2013/0151476 A1  Jun. 13, 2013

Related U.S. Application Data

(63) Continuation of application No. 13/313,348, filed on Dec. 7, 2011.

(51) Int. Cl.
*G06F 7/00* (2006.01)
(52) U.S. Cl.
USPC .......................................... 707/673
(58) Field of Classification Search
USPC ................................. 707/673, 741
See application file for complete search history.

(56) References Cited

U.S. PATENT DOCUMENTS

| | | | |
|---|---|---|---|
| 7,711,702 B2 | 5/2010 | Smolen et al. | |
| 8,046,366 B1* | 10/2011 | Perrin et al. | 707/741 |
| 2007/0203938 A1 | 8/2007 | Prahlad et al. | |
| 2007/0212507 A1* | 9/2007 | Arst et al. | 428/40.1 |
| 2007/0219970 A1* | 9/2007 | Dunie et al. | 707/3 |
| 2008/0263007 A1 | 10/2008 | Schmidt | |
| 2010/0293174 A1 | 11/2010 | Bennett et al. | |

OTHER PUBLICATIONS

Tse, et al., Efficient storage organization for the execution of visual queries in large object databases, Multimedia storage and archiving systems Conf IV: Boston MA, Sep. 1999.

* cited by examiner

*Primary Examiner* — Jensen Hu
(74) *Attorney, Agent, or Firm* — Griffiths & Seaton PLLC

(57) ABSTRACT

Processing archive content based on hierarchical classification levels is performed by indexing a first newly archived file of a current set of archive content at a first classification level defining a plurality of types of metadata to be derived, wherein the first classification level is selected from a hierarchy of classification levels having at least two classification levels, indexing a second newly archived file of the current set of archive content at a second classification level, wherein the second classification level includes fewer types of metadata than the first class of metadata, and flagging the second newly archived file of the current set of archive content. By classifying and flagging the second newly archived file differently than the first newly archived file, the system can easily retrieve such data at a later instance to update and/or change the data, re-index the data, and the like.

10 Claims, 3 Drawing Sheets

PROCESSING ARCHIVE CONTENT BASED ON HIERARCHICAL CLASSIFICATION LEVELS

CROSS-REFERENCE TO RELATED APPLICATIONS

The present application is a Continuation of U.S. patent application Ser. No. 13/313,348, filed Dec. 7, 2011.

BACKGROUND OF THE INVENTION

1. Field of the Invention

The present invention relates in general to file storage systems, and more particularly, to processing archive content.

2. Description of the Related Art

A storage management application, such as IBM® Tivoli® Storage Manager® (TSM) (registered to International Business Machines Corporation of Armonk, N.Y.), may be implemented on a storage management server. The storage management application manages storage requirements for a plurality of client nodes that are coupled to the storage management server via a network. The storage management application creates and manages a repository for data and programs that are backed up, archived, migrated, or otherwise copied from the client nodes to the storage management server.

The storage management server stores data objects, such as files, in one or more storage pools and uses a database stored in the storage management server for tracking information about the stored data objects. In this regard, an index on metadata associated with the data objects may be included. To locate certain archived files, the archive is mined via queries made on the index.

SUMMARY OF THE INVENTION

Usefulness of the index in locating certain archived files depends on the type, quantity, variety, and quality of the metadata extracted from the archived files. In some instances during archiving, the extracted metadata is found to be corrupted and/or metadata cannot be extracted from one or more of the archived file. In other instances, a processing error occurs during archiving and metadata is not extracted from the one or more archived files. Improved methods and systems are now provided that are useful for identifying such archived files so that if archiving technology improves, metadata may be extracted from these identified archived files.

In an embodiment, by way of example only, a method includes indexing a first newly archived file of a current set of archive content at a first classification level, the first classification level defining a plurality of types of metadata to be derived from the current set of archive content, wherein the first classification level is selected from a hierarchy of classification levels having at least two classification levels, indexing a second newly archived file of the current set of archive content at a second classification level, wherein the second classification level is selected from the hierarchy of classification levels and defines a second type of metadata is to be derived from the current set of archive content, and the second class of metadata includes fewer types of metadata than the first class of metadata, and flagging the second newly archived file of the current set of archive content.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below relate to processing archive content based on hierarchical classification levels. The embodiments include processing archive content by indexing a first newly archived file of a current set of archive content at a first classification level, the first classification level defining a plurality of types of metadata to be derived from the current set of archive content, wherein the first classification level is selected from a hierarchy of classification levels having at least two classification levels, indexing a second newly archived file of the current set of archive content at a second classification level, wherein the second classification level is selected from the hierarchy of classification levels and defines a second type of metadata is to be derived from the current set of archive content, and the second class of metadata includes fewer types of metadata than the first class of metadata, and flagging the second newly archived file of the current set of archive content. By classifying and flagging the second newly archived file differently than the first newly archived file, the system can easily retrieve such data at a later instance to update and/or change the data, re-index the data, and the like. Such methods can be retro-fitted into existing systems and are useful for archiving files of various types of file storage systems, such as clustered storage systems.

Figure 1:
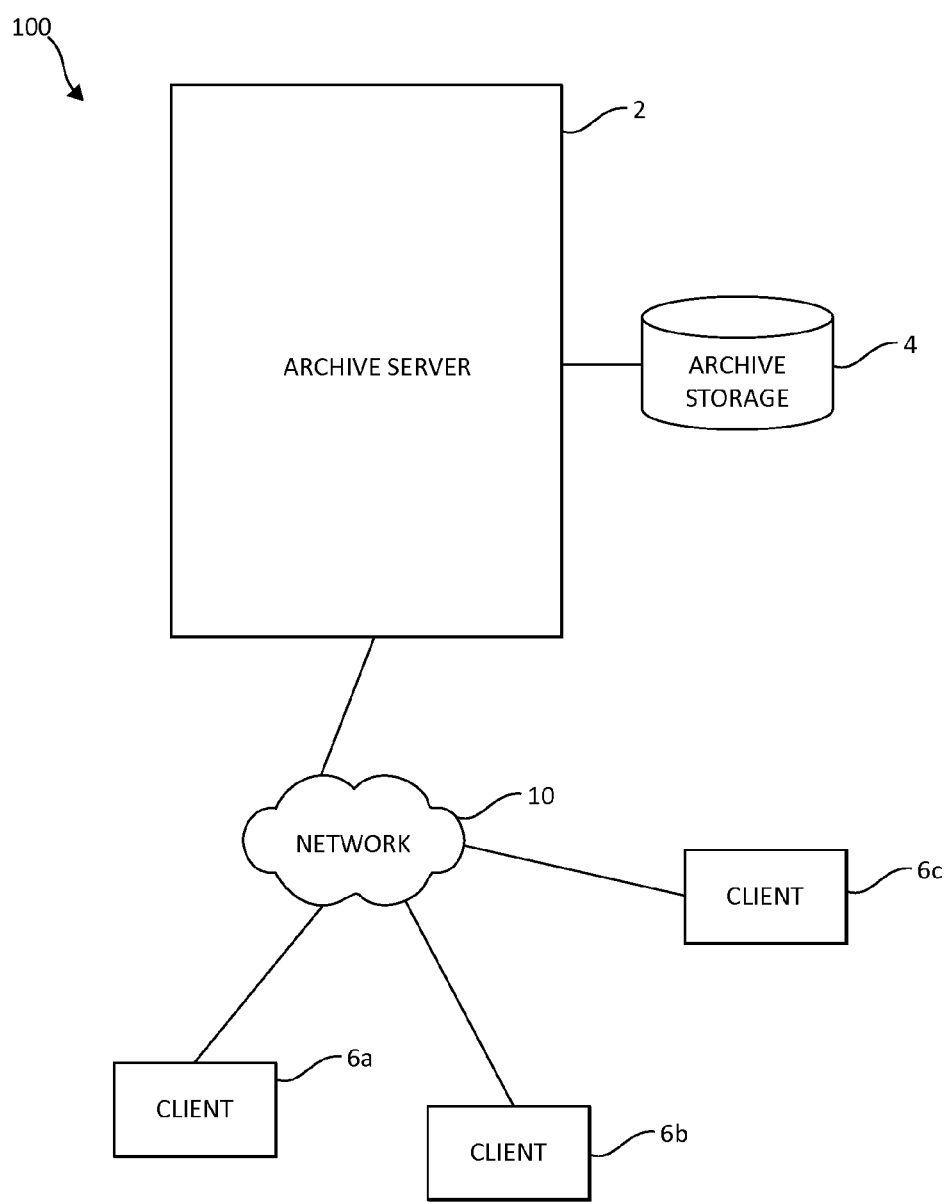
FIG. 1 is a schematic of a network computing environment, according to an embodiment.

FIG. 1 illustrates a computing environment in which embodiments of the invention are implemented. An archive server 2 maintains archive objects in archive storage 4. The archived objects may originate from client systems 6a, 6b, 6c, where the clients 6a, 6b, 6c communicate objects to the archive server 2 over a network 10. In accordance with an embodiment, the archive server 2 includes an archive program which performs archive related operations, an archive database maintaining records providing information on archived objects, and a retention protection setting controlling the extent to which the archive program permits users to remove or modify information in the database and archived objects from the archive storage 4. All archive related operations are managed by the archive program to ensure compliance with a configured archival policy. The archive database may include an object table having an entry (record) for each archived object providing information on the object and an expiration table having one entry (record) for each initiated or expired retention period running with respect to one archived object.

The archive server 2 may be implemented as a clustered file system and comprises one or more nodes. The archive server 2 is a server class machine, in an embodiment, and the client systems 6a, 6b, 6c may comprise any computing device known in the art, such as a server class machine, mainframe, workstation, desktop computer, handheld computer, etc. The data archived from the client systems 6a, 6b, 6c may comprise data in a database, application program data, files in a filesystem, etc. The archival storage 4 may comprise any mass storage device known in the art, such one or more interconnected disk drives configured as a Redundant Array of Independent Disks (RAID), Just a Bunch of Disks (JBOD), Direct Access Storage Device (DASD), as a tape storage device, e.g., a tape library, or etc. The network 10 may comprise any interface between storage and a host known in the art, such as a network connection (e.g., Ethernet, wireless ethernet, Fibre Channel, etc.) or any other network or storage transfer protocol known in the art.

Figure 2:
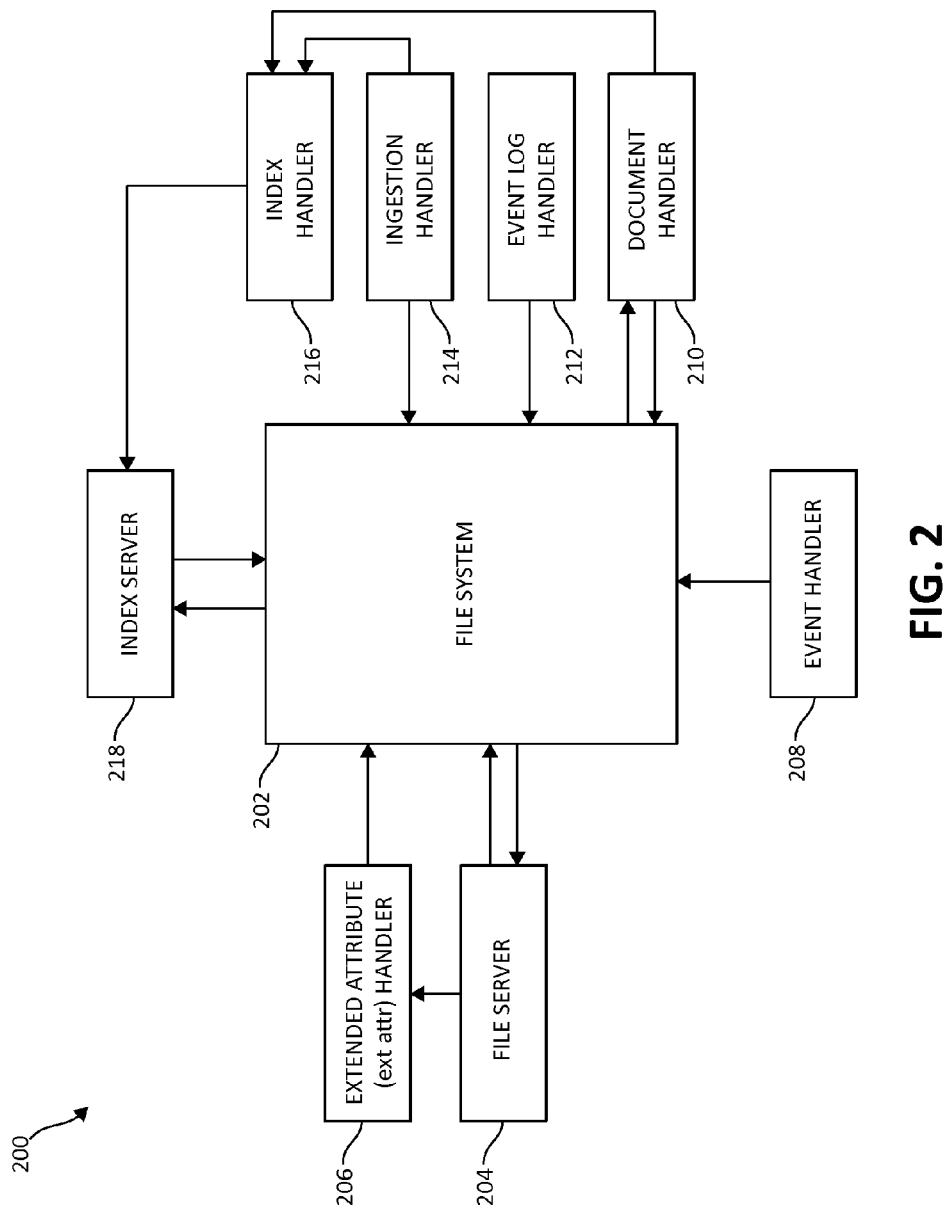
FIG. 2 is a schematic of a system that indexes information that is ingested into archival storage, according to an embodiment.

FIG. 2 is a schematic of a system 200 that indexes information that is ingested into archival storage (e.g., archive storage 4), in an embodiment. The system 200 is a node of the archive server 2 and generally includes a file system 202, a file server 204, an extended attribute handler 206, an event handler 208, a document handler 210, an event log handler 212, an ingestion handler 214, an index handler 216, and an index server 218. The file system 202 resides on the node and includes files. The file server 204 communicates with the file system 202 and presents files gathered from the file system 202 to the extended attribute handler 206 to associate additional metadata to the files. According to an embodiment, the file server 204 is included in the archive server 2. In an embodiment, the metadata can include non-standard attributes, such as user-defined metadata (i.e., department, author or other similar data, (name,value) pairs of type string, numeric, Boolean, date), archive extended attributes (e.g., service class, md5sum, retention time, etc.), archive indexing extended attributes (e.g., index level, index epoch, index time, index core, etc.), or other types of attributes.

The event handler 208, the document handler 210, event log handler 212, ingestion handler 214, and index handler 214 can be included as part of the backup server program 114. In an embodiment, the event handler 208 handles inputs received by the backup server program 114. The document handler 210 is configured to store metadata values into extended attributes and initiate index processing by the index handler 216. The event log handler 212 captures file system events for later processing, including ingesting and indexing and the like. The ingestion handler 214 is configured to coordinate the processing required for trapped file system events. For example, the ingestion handler 214 initiates processing of newly archived files by the document handler 210. In another example, the ingestion handler 214 initiates processing of deleted archived files by the index handler 216. The index handler 216 is configured to assimilate all information needed to add/update entries in the index or delete entries from the index. The index server 218 efficiently stores and retrieves indexing information on extracted metadata and text to/from an underlying index. In another embodiment, the archive server 2 includes additional nodes without the index server 218.

Figure 3:
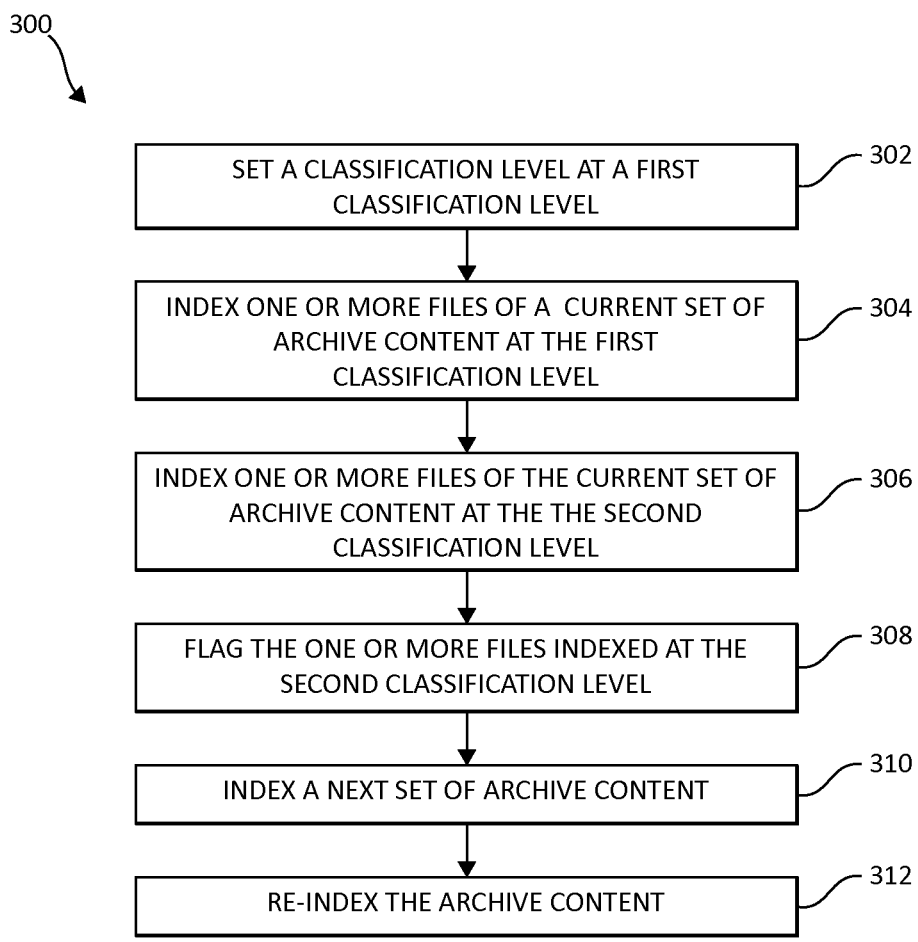
FIG. 3 is a flow diagram of a method of processing archive content, according to an embodiment.

During operation, the system 200 uses the metadata to index and search for archived content. FIG. 3 is a method of processing archive content, according to an embodiment. In an embodiment, a classification level for which metadata is derived from a current set of archive content is set at a first classification level, step 302. In this regard, the classification level is selected from a hierarchy of classification levels. Each level includes different types of metadata that is derived from the archive content. In an example, the hierarchy of classification levels includes four levels—level 3, level 4, level 5, and level 6. For level 3, the archive content is not indexed. Level 4 can include indexing archive content according to file system attributes, archive extended attributes, and user metafile metadata. Level 5 can include indexing archive content according to the attributes listed in level 4 and, in addition, extracted metadata (e.g., text extracted from contents of a file, author/title of a file, and the like). Level 6 can include indexing archive content according to the attributes listed in level 5 and in addition, extracted metadata with highlighting. In other embodiments, more or fewer classification levels are included and/or each level indexes the archive content differently. The first classification level is a highest level enabled by the system or user.

With additional reference to FIG. 2, according to an embodiment, the current set of archive content comprises a file that is ingested by the file server 206 and is to be archived (referred to herein as "newly archived file"). Before the newly archived file is indexed, the file server 206 presents the newly archived file to the extended attribute handler 206 to associate certain metadata to the newly archived file prior to being presented to the file system 202, in an embodiment. In another embodiment, the newly archived file is presented directly to the file system 202. The event handler 208 detects the presentation of the newly archived file to the file system 202 and logs the presentation as an event on an event log. The ingestion handler 214 obtains a change log from the event log handler 212 and applies a given policy to the file system 202. The document handler 210 sets extended attributes according to the policy and logs on an index any changes made to the file system 202 as a result of the application of the policy. For example, the document handler 210 makes insertions and/or updates to the index. The index handler 216 assimilates all information needed related to the newly archived file to add/update entries in the index or delete entries from the index on the index server 218, depending on the selected classification level.

One or more of the newly archived files of the archive content is indexed at the first classification level, step 304. In an embodiment in which the document handler 210 sets the first classification level at Level 4, the index handler 216 assimilates metadata to be indexed and sets indexing of extended attributes of the newly archived file. In another embodiment in which the document handler 210 sets the first classification level at Level 5, the index handler 216 assimilates metadata to be indexed and sets indexing of extended attributes of the newly archived file and the index server 218 extracts metadata. If the first classification level is at Level 6, the index handler 216 assimilates metadata to be indexed and sets indexing of extended attributes of the newly archived file, and the index server 218 extracts metadata and stores extracted text in the index.

In an embodiment, metadata included in a file of the archive content cannot be extracted or contains extraction errors or processing errors. Hence, the file is indexed at a second classification level, step 306. The second classification level is a classification level that includes fewer types of metadata derived from the archive content than those types derived for the first classification level. In an embodiment, the second classification level is the highest level from which metadata is successfully generated or derived from the archive content.

Next, the file indexed at the second classification level is flagged, step 308. An identifier or tag is associated with the current archive content. In an example, if an attempt to index the newly archived file at the first classification level (e.g., Level 5 or Level 6) is unsuccessful (e.g., an extraction error or processing error occurs) the index handler 216 retries indexing at a lower classification level (e.g., Level 5, if the first classification level is level 6, or Level 4, if the first classification level is Level 5). The index handler 216 flags the newly archived file with a change in classification level (e.g., from Level 5 to Level 4). In this way, the flagged file of the current archive content can be identified for re-indexing when metadata generation technology improves. After step 308, a next set of archive content is indexed, step 310.

In an embodiment, the archive content is re-indexed, step 312. Re-indexing occurs in response to a request to index the archive content at a new classification level, or additions/changes to user defined metafile metadata, or a retroactive policy scan. In an embodiment in which re-indexing occurs by request, the ingestion handler 214 scans the file system 202 for a set of archive content previously indexed at a level classification lower than the new classification level, and the index server 218 extracts the metadata from the previously-indexed set of archive content at the new classification level. In another embodiment in which re-indexing occurs by addition or changes to user defined metafile metadata, the extended attribute handler 206 signals changes or additions to (name,value) pairs by setting new extended attributes for the newly archived files on a per file basis, which causes the ingestion handler 214 to scan the file system 202 for a set of archive content previously indexed without the new extended attributes and the index handler 216 to index the previously-indexed set of archive content with the new extended attributes. If re-indexing occurs by a retroactive policy scan, the document handler 210 signals a change by setting new extended attributes for the newly archived files on a per file bases, which causes the ingestion handler 214 to scan the file system 202 for a set of archive content previously indexed without the new extended attributes and the index handler 216 to index the previously-indexed set of archive content with the new extended attributes.

Indexing archive content at a highest classification level enabled by a user or system or at a highest classification level at which metadata is successfully generated or derived from the archive content and flagging the content indexed at a classification level lower than the highest enabled classification level allows such content to be retrieved later for re-indexing. In particular, indexing at a new classification level can be applied retroactively to files that have already been indeed. Additionally, the above-described methods and systems maintain consistency between the index and archive content as files are indexed and/or re-indexed.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

What is claimed is:

1. A method of processing archive content, the method comprising:
    indexing a first newly archived file of a current set of archive content at a first classification level, the first classification level defining a plurality of types of metadata to be derived from the current set of archive content, wherein the first classification level is selected from a hierarchy of classification levels having at least two classification levels;
    indexing a second newly archived file of the current set of archive content at a second classification level, wherein the second classification level is selected from the hierarchy of classification levels and defines a second type of metadata is to be derived from the current set of archive content, and the second class of metadata includes fewer types of metadata than the first class of metadata;
    flagging the second newly archived file of the current set of archive content;
    locating all flagged archive content at a later time;
    re-indexing the flagged archive content at the second classification level of the hierarchy of classification levels at the later time; and
    setting a classification level to a third classification level of the hierarchy of classification levels in which no metadata is derived from archive content.

2. The method of claim 1, wherein the hierarchy levels include a classification level in which file system attributes, general parallel file system archive extended attributes, and user metafile metadata are derived from archive content.

3. The method of claim 1, wherein the hierarchy levels include a classification level in which file system attributes, general parallel file system archive extended attributes, user metafile metadata, and extracted metadata are derived from archive content.

4. The method of claim 1, wherein the hierarchy levels include a classification level in which file system attributes, general parallel file system archive extended attributes, user metafile metadata, and extracted metadata with highlighting are derived from archive content.

5. The method of claim 1, further comprising:
    detecting a retroactive policy scan, before the step of re-indexing.

6. The method of claim 1, wherein the step of indexing the second newly archived file of the current archive content includes indexing the second newly archived file with extraction errors.

7. The method of claim 1, wherein the step of indexing the second newly archived file of the current archive content includes indexing the second newly archived file due to processing errors.

8. The method of claim 1, wherein indexing a second newly archived file includes initially attempting to index the second newly archived file at the first classification level, and indexing the second newly archived file at the second classification level, if the second newly archived file includes archive content required for extraction at the first classification level that cannot be extracted.

9. The method of claim 1, wherein indexing a second newly archived file includes:
    signaling changes to user defined new extended attributes associated with the newly archived file;
    scanning the file system for archive content previously indexed without the new extended attributes, in response to the changes; and
    re-indexing the flagged newly archived file with the new extended attributes.

10. The method of claim 5, wherein detecting the retroactive policy scan includes initiating the computer code for locating all the flagged archive content.

* * * * *